Dec. 19, 1967     C. O. BARBRE     3,359,126
ALKYLOLAMINE ANTI-STATIC SURFACE TREATMENT OF PLASTIC FILMS
Filed Jan. 12, 1966
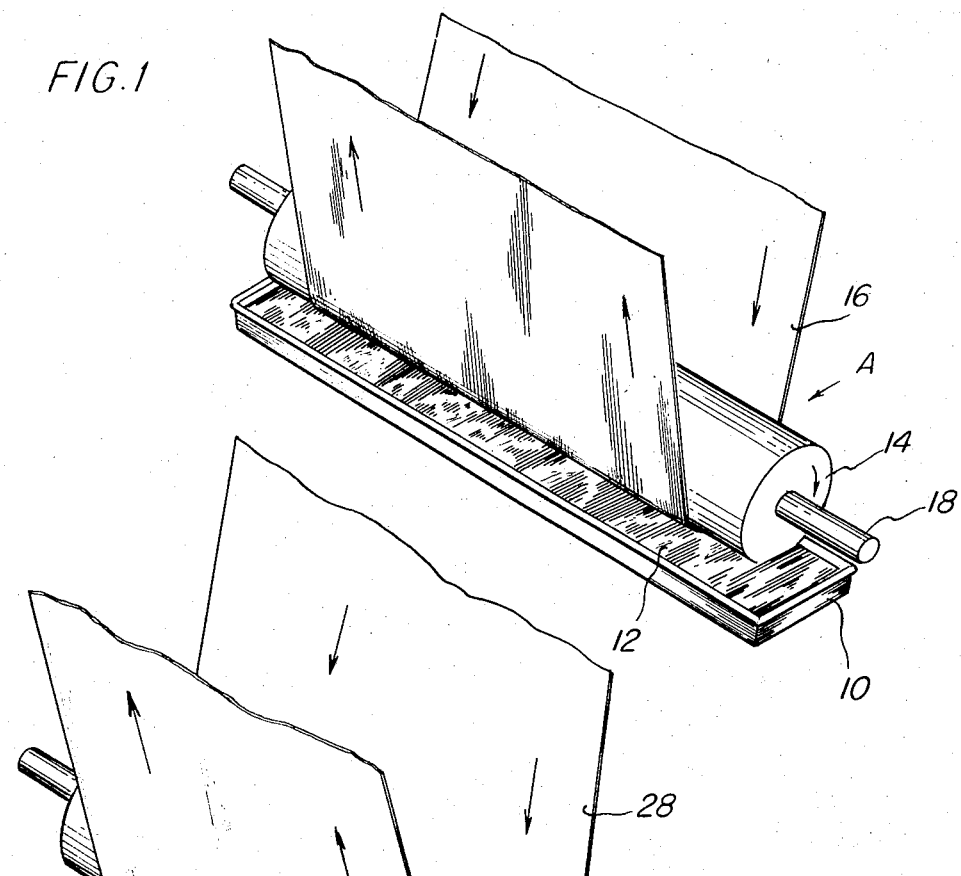
FIG.1
FIG.2
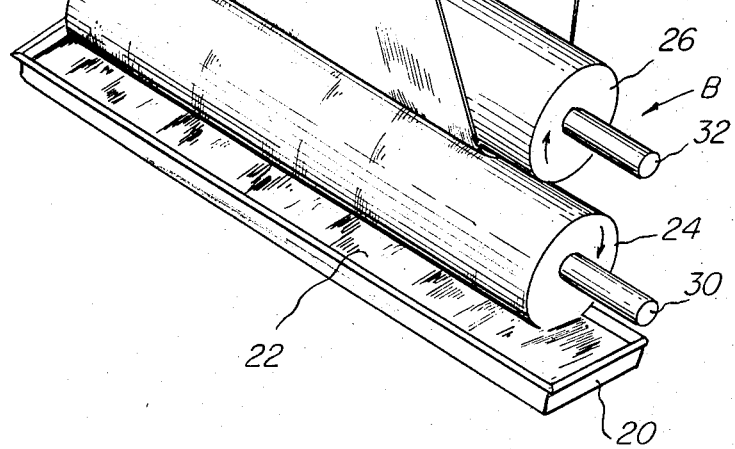
Inventor
Charles O. Barbre
By his attorneys United States Patent Office 3,359,126
Patented Dec. 19, 1967

3,359,126
ALKYLOLAMINE ANTI-STATIC SURFACE
TREATMENT OF PLASTIC FILMS
Charles O. Barbre, % Celanese Corp. of America,
Belvidere, N.J. 07823
Filed Jan. 12, 1966, Ser. No. 520,228
1 Claim. (Cl. 106—186)

ABSTRACT OF THE DISCLOSURE

The accumulation of static charges upon a cellulose ester film is prevented by applying to the film a film-forming polymer, a ketone, and an anti-static agent of the class of organic compounds encompassing hydroxy alkylamines and/or their derivatives.

The present invention relates broadly to plastic films, and is more particularly concerned with the surface treatment of such films to reduce their tendency to accumulate static charges.

Plastic films, exemplified by those of the cellulose ester type, find widespread use in photographic applications. It is customary in the art to apply to one surface of the film a subbing layer, which is generally comprised of a gelatinous material in acetone and methanol, followed in a later step by the application of a light-sensitive emulsion conventionally including silver halide and gelatin particles. The emulsion which provides the light sensitive layer upon the subbed film is applied at relatively high film speeds, and it has been found that as a result substantial static charges accumulate on the opposite film surface to such an extent that there is created what those skilled in the art have termed a "lightning effect." This has a deleterious effect upon the silver halide coating, producing lines therein which destroy the ultimately developed image.

Another problem which has been noted is the tendency of the subbed film to curl, creating problems in subsequent processing and rendering difficult, if not impossible, the proper application of the light-sensitive emulsion. While other explanations may exist, it appears that the solvent system in the subbing material is the cause of curling.

It is accordingly a primary aim of the instant invention to eliminate each of the aforementioned disadvantages of current film processing techniques.

Another object of this invention is to provide an anti-static treatment for plastic films featuring the use in a suitable solvent system of a film-forming polymer in combination with an anti-static agent.

Still another object of the instant invention is to provide a process for reducing the tendency of plastic films to accumulate static charges, which process can be practiced at relatively high film speeds as an in-line operation.

A further object of this invention lies in the provision of an anti-static coating composition particularly effective on cellulose ester films and sheets and which includes in one or more organic solvents a cellulose ester as the film-forming material and an anti-static agent which is a hydroxy alkylamine.

Other objects and advantages of this invention will be apparent from the following detailed description and claim.

In the drawings, wherein like numerals are employed to designate like parts throughout the same;

FIGURES 1 and 2 are diagrammatic views of illustrative coating equipment which may be employed to practice the process of this invention.

Broadly stated, the destaticizing composition of this invention includes as the solvent a ketone, which is preferably acetone, a film-forming polymer which can have the same composition as the film base being treated, and an anti-static agent of the class of organic compounds encompassing hydroxy alkylamines and/or their derivatives. If desired, the anti-static coating composition may also include an alcohol, exemplified by methanol, and water.

A preferred composition for use on a cellulose acetate film base having an acetyl value of 53.5 to 56.5%, calculated as combined acetic acid, includes 50 to 99.6% acetone, 50 to 0% methanol, 8 to 0% water, 2.0 to 0.2% cellulose acetate, and 2.0 to 0.2% of a hydroxy alkyl amine serving as the anti-static agent in the composition. As used herein, all percentages are by weight.

A somewhat narrower range of ingredients offering good results in the reduction or elimination of static charges includes 60 to 80% acetone, 36.8 to 18.8% methanol, 1.2 to 0.2% water, 1.0 to 0.5% cellulose acetate, and 1.0 to 0.5 of an anti-static agent which is preferably N,N bis(2 hydroxy ethyl alkyl $C_{12}$–$C_{18}$) amine. Even more specifically, for use on cellulose triacetate film, an optimum formulation is composed of 61.4% acetone, 36.4% methanol, 0.8% water, 0.7% cellulose acetate, and 0.7% of the mentionel amine.

In the formulations given above other ketones may be employed, as for example, methyl ethyl ketone. These materials perform a slight dissolving or etching function to somewhat swell the surface of the film and to render it more receptive to firm bonding with the film-forming polymer. The film-forming polymer, in accordance with this invention, could be other cellulose esters, such as cellulose propionate, cellulose butyrate, cellulose acetate-propionate and cellulose acetate-butyrate, or cellulose ethers, such as ethyl cellulose or benzyl cellulose. This would of course depend upon the composition of the film base itself, and in certain instances acrylates may be used or combinations of nitrocellulose and alkyd type resins.

The alcohol in the present composition functions as a diluent for the acetone to reduce somewhat the dissolving or etching effect of the ketone. By reducing the "bite" of the acetone there is a much reduced tendency for curling of the film base. The alcohol can be any primary or lower alcohol containing up to 4 carbon atoms, and accordingly, in substitution for methanol one could use ethanol, isopropyl alcohol or the butyl alcohols.

The anti-static agents employed in this invention are the hydroxy alkyl amines and/or their derivatives, such as salts, soaps, ester and acid amides, particularly of the higher fatty acids such as for instance, capric, lauric, myristic, oleic or stearic acids, or di- or polyhydric alcohol derivatives in which some of the hydroxy groups of the alcohols have been esterified by fatty acids, particularly the higher fatty acids. Mixtures of two or more of such bodies may also be used. More specifically, a preferred anti-static agent is N,N bis(2 hydroxy ethyl alkyl $C_{12}$–$C_{18}$) amine, or a like compound in which the alkyl is $C_{18}$ alone.

The process of this invention is particularly well adapted for practice in connection with the band casting of cellulose ester materials. As is known, the film or sheet has what is termed in the art a "band side" and an "air side" or "back side," the latter two expressions being used to refer to that surface of the film which has not been in contact with the metal casting band itself. It is the band side which receives the subbing and any subsequent coatings, and it is the air or back side which is treated in accordance with the novel concepts of this invention to eliminate curling and the generation of static charges thereon which, as was noted earlier, produce a lightning effect resulting in interference with the silver halide or other light-sensitive coating.

Various types of apparatus can be employed to practice the present process, and illustrative equipment for this purpose is shown in FIGURES 1 and 2. With reference first to FIGURE 1, a tank or pan 10 may be supported by suitable structure (not shown), the pan housing a suitable quantity of destaticizing solution 12. Partially immersed in the solution 12 is a pick-up roll 14 which rotates in a clockwise direction to apply by capillary action the desired amount of treating solution to the traveling plastic film or sheet 16. The pick-up roll 14 is journaled in any suitable manner and is supported upon shaft means 18. The apparatus of FIGURE 1, designated in its entirety by the legend A, as well as the apparatus B of FIGURE 2, is located downstream of a conventional band casting machine well known to the art, and thus is a part of an in-line operation. As is conventional in the coating art, suitable solvent recovery equipment would be provided.

The apparatus B of FIGURE 2 includes a pan or tank 20 containing destaticizing solution 22 in which is partially immersed a transfer roll 24 rotating in the direction indicated in nip-defining relation with a pick-up roll 26, the roll 24 transferring the desired quantity of solution 22 to the nip defined with the counter-rotating roll 26, whereby the solution 22 is transferred by capillary action to the traveling plastic film or sheet 28. As appears, the rolls 24 and 26 are equipped with shaft means 30 and 32, respectively, suitably journaled for rotation in the directions indicated by arrows on said rolls.

A preferred mode of practicing the invention is to backwash the air side of the film or sheet 16 or 28 with the coating apparatus A or B being located slightly downstream of the point at which the film or sheet is taken from the casting band. The destaticizing solution 12 or 22 is then applied to the air side in the manner shown, and after permitting adequate drying time, the film or sheet is trained by guide rollers to a subbing station whereat a conventional sub layer is applied to the band side of the film base. As was mentioned, such subbing coats conventionally comprise acetone, methanol and gelatin. Again, the film is allowed to dry and is further processed prior to the application of the light sensitive emulsion. This may be done by the manufacturer of the film, or as is more frequently the case, the subbed film is shipped to a manufacturer of photographic film products for application of the silver halide or other light-sensitive coating.

It was noted hereinabove that many variations can be practiced in the formulation of this invention, including elimination of the alcohol and water and the substitution of other ketones for acetone. As well, the film-forming polymer need not be cellulose acetate, nor is the invention limited to the treatment of cellulose ester films or sheets. Further, while a specific hydroxy alkylamine has produced particularly satisfactory results in practice, those skilled in the art having benefit of the instant teachings will no doubt conceive of alternative materials. These and other changes may be practiced in the instant invention without departing from the spirit of the invention or the scope of the sub-joined claim.

The embodiments of the invention, in which an exclusive property or privilege is claimed, are defined as follows:

A composition for preventing the accumulation of static charges upon a cellulose acetate film, which comprises cellulose acetate in an amount of between 1.0 and 0.5%; N,N-bis(2-hydroxy ethyl alkyl $C_{12-18}$) amine in an amount of between 1.0 and 0.5%; acetone in an amount of between 60.0 and 80.0%; 36.8 to 18.8% methanol; and 1.2 to 0.2% water, all percentages being by weight.

References Cited

UNITED STATES PATENTS

| | | | |
|---|---|---|---|
| 2,067,219 | 1/1937 | Whitehead | 106—186 |
| 2,233,001 | 2/1941 | Dickey. | |
| 2,570,094 | 10/1951 | Bradley. | |
| 2,584,337 | 2/1952 | Famulener. | |
| 2,891,031 | 6/1959 | Coler. | |
| 2,891,032 | 6/1959 | Coler. | |

FOREIGN PATENTS

| | | |
|---|---|---|
| 526,881 | 1/1956 | Canada. |
| 437,226 | 10/1935 | Great Britain. |
| 820,541 | 9/1959 | Great Britain. |

JULIUS FROME, *Primary Examiner.*